US008458754B2

(12) United States Patent
Corson

(10) Patent No.: US 8,458,754 B2
(45) Date of Patent: Jun. 4, 2013

(54) METHOD AND SYSTEM FOR PROVIDING INSTANT START MULTIMEDIA CONTENT

(75) Inventor: Greg Corson, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 2952 days.

(21) Appl. No.: 09/765,593

(22) Filed: Jan. 22, 2001

(65) Prior Publication Data

US 2002/0147979 A1   Oct. 10, 2002

(51) Int. Cl.
*H04N 7/173* (2006.01)

(52) U.S. Cl.
USPC .................. 725/90; 725/89; 725/101; 725/87

(58) Field of Classification Search
USPC ............ 709/217, 219; 725/35, 90, 93, 86–89, 725/95, 97, 101, 134, 142
See application file for complete search history.

(56) References Cited

U.S. PATENT DOCUMENTS

| | | | |
|---|---|---|---|
| 4,422,093 A | 12/1983 | Pargee, Jr. | |
| 4,499,568 A | 2/1985 | Gremillet | |
| 4,506,387 A | 3/1985 | Walter | |
| 4,849,811 A | 7/1989 | Kleinerman | 358/133 |
| 4,897,717 A | 1/1990 | Hamilton | |
| 4,918,523 A | 4/1990 | Simon et al. | |
| 4,963,995 A | 10/1990 | Lang | |
| 4,974,178 A | 11/1990 | Izeki et al. | |
| 5,010,399 A | 4/1991 | Goodman et al. | 358/85 |
| 5,057,932 A | 10/1991 | Lang | |
| 5,132,992 A | 7/1992 | Yurt et al. | |
| 5,164,839 A | 11/1992 | Lang | |
| 5,276,866 A | 1/1994 | Paolini | |

(Continued)

FOREIGN PATENT DOCUMENTS

| | | |
|---|---|---|
| JP | 08-149451 | 6/1996 |
| JP | 09-326777 | 12/1997 |

(Continued)

OTHER PUBLICATIONS

Gelman et al., "A Store and Forward Architecture for Video-on-Demand Service," Proc. IEEE ICC, IEEE Press, Piscataway, N.J., 1991, pp. 27.3.1-27.3.5.

(Continued)

*Primary Examiner* — Pankaj Kumar
*Assistant Examiner* — Usha Raman
(74) *Attorney, Agent, or Firm* — Carr & Ferrell LLP

(57) ABSTRACT

A system and method for providing multimedia content through a cable, satellite television or other content server system. A server facility which provides multimedia content divides formatted multimedia content into data chunks (e.g., collections of data corresponding to one minute lengths) prior to transmission to a user/subscriber receptor unit, and sends the divided data chunks according to a schedule which permits instantaneous starting and viewing of the multimedia content, such as movies, upon user/subscriber request. The user/subscriber receptor unit includes a cable box, video game device, or the like having a digital video recording capability and at least a memory capacity or disk space sufficient to store a complete unit of media content, such as full-length feature film. The invention does not require intensive interaction between the server facility and the receptor unit, but rather, only requires sending of content signals in the form of an interleaved media stream from the server facility to the receptor unit. Further, the invention requires the use of no more than six times the bandwidth of the original signal for operation.

45 Claims, 3 Drawing Sheets

U.S. PATENT DOCUMENTS

| | | | |
|---|---|---|---|
| 5,539,448 A | 7/1996 | Verhille et al. | 348/6 |
| 5,701,582 A * | 12/1997 | DeBey | 725/103 |
| 5,751,336 A | 5/1998 | Aggarwal et al. | |
| 5,831,662 A | 11/1998 | Payton | |
| 5,933,603 A | 8/1999 | Vahalia et al. | |
| 5,940,738 A * | 8/1999 | Rao | 725/103 |
| 5,963,202 A | 10/1999 | Polish | |
| 5,995,705 A | 11/1999 | Lang | |
| 6,061,504 A | 5/2000 | Tzelnic et al. | |
| 6,502,139 B1 * | 12/2002 | Birk et al. | 709/233 |
| 6,622,305 B1 * | 9/2003 | Willard | 725/101 |
| 6,637,031 B1 | 10/2003 | Chou | |
| 6,701,528 B1 * | 3/2004 | Arsenault et al. | 725/89 |
| 6,738,983 B1 * | 5/2004 | Rao et al. | 725/120 |
| 6,763,392 B1 | 7/2004 | Del Val et al. | |
| 7,155,735 B1 * | 12/2006 | Ngo et al. | 725/101 |
| 2001/0021999 A1 * | 9/2001 | Seifert | 725/87 |

FOREIGN PATENT DOCUMENTS

| | | |
|---|---|---|
| JP | 10-108161 | 4/1998 |
| WO | WO 91/03112 | 3/1991 |
| WO | WO 98/44424 | 10/1998 |
| WO | 0027106 A | 5/2000 |
| WO | WO 00/27106 | 5/2000 |
| WO | WO 01/63929 | 8/2001 |

OTHER PUBLICATIONS

Hua et al., "Patching: A Multicast Technique for True Video-on-Demand Services," Proceedings of the ACM Multimedia 98, Sep. 12, 1998, pp. 191-200.

Jones, "The Microsoft Interactive TV System: An Experience Report," Technical Report MSR-TR-97-18, Jul. 1997.

Carter et al., "An Efficient Implementation of Interactive Video-on-Demand," Proc. of the 8th Int'l Symp. on Modeling, Analysis & Simulation etc., IEEE, 2000.

"Multicast over TCP/IP Howto: Multicast Transport Protocols.", Mar. 20, 1998, http://www.tldp.org/HOWTO/Multicast-HOWTO-9.html.

"Streaming Media", Wikipedia, the free encyclopedia, Publication date unknown/ Accessed Jun. 4, 2007, http://en.wikipedia.org/wiki/Streaming_media#Protocol_issues.

"User Datagram Protocol", Wikipedia, the free encyclopedia, Publication date unknown/ Accessed Jun. 4, 2007, http://en.wikipedia.org/wiki/User_Datagram_Protocol#Difference_between_TCP_and_UDP.

"Transmission Control Protocol", Wikipedia, the free encyclopedia, Publication date unknown/ Accessed Jun. 4, 2007, http://en.wikipedia.org/wiki/Transmission_Control_Protocol#Ordered_data_transfer.2C_Retransmission_of_lost_packets_.26_Discarding_duplicat.

"Image:TCP state diagram.jpg", Wikipedia, the free encyclopedia, Publication date unknown/ Accessed Jun. 4, 2007, http://en.wikipedia.org/wiki/Image:TCP_state_diagram.jpg.

"Reliable User Datagram Protocol", Wikipedia, the free encyclopedia, Publication date unknown/ Accessed Jun. 4, 2007, http://en.wikipedia.org/wiki/Reliable_User_Datagram_Protocol.

Rob Pike et al., Plan 9 from Bell Labs, Bell Laboratories, Murray Hill, New Jersey, USA.

Arthur D. Allen, Optimal Delivery of Multi-Media Content over Networks, Burst.com Inc., Mar. 15, 2001, San Francisco, CA, USA.

* cited by examiner

METHOD AND SYSTEM FOR PROVIDING INSTANT START MULTIMEDIA CONTENT

BACKGROUND OF THE INVENTION

1. Field of Invention

This invention generally relates to the field of digital computer systems and particularly in the field of video and multimedia computer servers and systems, along with the associated delivery of such content to a user/subscriber premises.

2. Description of the Related Art

Distribution of full motion video and audio data has evolved from early television broadcasting to meet viewer demand. Earliest video distribution was by point-to-point wiring between a camera and a video monitor. This was followed by scheduled television broadcasting of programming over the public air waves. In the 1960s, Community Antenna Television (CATV) was chartered to provide off-air television signals to viewers in broadcast reception fringe areas. Later, under FCC regulation, the CATV industry was required to provide local access and original programming in addition to off-air broadcast signal distribution.

In response, several sources of cable network programming were established. Because of the wide bandwidth available on cable television systems, additional channels were made available for the new programming. However, programming was generally prescheduled, with the viewer left to tune to the designated channel at the appointed time to view a particular program.

To increase revenues, cable television systems have initiated distribution of premium channels viewable only by users/subscribers having appropriate descramblers. The descramblers are tuned to receive only premium channels, descramble the video and audio information and supply a signal capable of reception on a standard television set.

Pay-per-view programs, which evolved later, include recently released movies, live concerts, popular sporting events, etc. Users/subscribers wishing to view a pay-per-view program place an order with the cable operator. At the designated time, the user/subscriber's descrambler is activated to permit viewing of the pay-per-view programming. However, the user/subscriber is restricted to viewing the programming at the scheduled time. There is no capability of delivering programming to a user/subscriber on demand, that is, immediately or at a user/subscriber-specified time and date.

In the early 1980s, technological advances resulted in the proliferation of Video Cassette Recorders (VCR), establishing a second course for video programming distribution. Pre-recorded video programs are now available for sale and rental to VCR owners. Using a VCR, the viewer selects from among many titles available for sale and rental, and views the program when convenient. The VCR owner further has the capability to selectively view the programming using special functions of the VCR, such as pause, fast forward, reverse, slow motion, etc. The viewer can thus manipulate and replay portions of the program at will.

The penalty for this convenience, however, is in the necessity to travel to the local video rental/sales store, if necessary wait for a popular video program tape to become available, once the program is obtained return home to view it and then revisit the video store to return the tape.

Telephone lines have been suggested as an alternative means of video distribution in Goodman et al., U.S. Pat. No. 5,010,399 and Kleinerman, U.S. Pat. No. 4,849,811. However, systems using the public switched telephone network (PSTN) are often bandwidth limited, providing only still frame or video conferencing capabilities. Because telephone system carriers for the most part use the PSTN only for connectivity between users/subscribers, there is no capability for dynamic routing of digitized video without dedicated leased, wide bandwidth circuits. Telephone line-based systems also fail to provide acceptable VCR type functional control of the programming.

Alternatively, the Internet, World Wide Web, cable and satellite delivery systems continue to provide growing bandwidth communication channels which will soon interconnect most households and businesses and promise to provide many services to connected users. These services include instant access to large databases of financial, educational and other multimedia information, in addition to real-time interaction with virtual communities of people with similar interests. Among the services that will be available, one that has received a great deal of corporate and media attention is the provision of video on demand (VOD).

VOD holds out the promise that almost every movie ever made will be available to a user of the service at any time. Instead of driving to a video rental store and selecting a movie, users will be able to select any movie stored in the multimedia content server system's video library and have that movie delivered to them over the Internet, or by cable or satellite systems.

Before the promise of VOD can be realized, many problems must be solved. Even a relatively short film of two hours duration contains approximately $2.2 \times 10^{10}$ bits of data. Standard methods to compress and store the vast quantity of data contained in a film library of thousands of titles must be agreed upon. Even after the data has been captured and stored, there is no industry agreement as to what system will be needed to deliver the stored data to users.

Any proposed system must satisfy rigorous user demands. Users will want whatever film they have selected delivered to them quickly. They will also want the ability to start and stop the film at any point, as well as the ability to fast forward (FF) and fast reverse (FR) the film at will. According to existing prior art systems, this typically done by sending a unique stream of data (i.e., the movie) to each subscriber. However, because thousands of people could be watching the movie at the same time, providing these capabilities to every user at any time would place enormous demands on the system's storage units, internal buses, and processing units. Even the enormous bandwidth of fiber optic cable may be exceeded.

Additionally, some two-way communication between the user and the system is necessary to communicate users' requests, as well as billing information and the like. This two-way communication places additional burdens on the system.

Programming-on-demand cable systems have been proposed which allow any one of a plurality of individual users to request any one of a plurality of video programs they wish to view (time delayed) from the server's library of programs, and permits the requested program to be available for subsequent viewing on a conventional television set at the user's location following a request initiated by the user/subscriber. Each program is pre-stored in a digital storage device and is selectable by a host computer or server system at the headend facility in response to an address signal transmitted from the user/subscriber. The host computer in conjunction with other communication and data processing hardware and software transmits the video program as digital data at a high non-real-time rate over a high bandwidth system, such as a fiber optic line network, to a data receiving station at the user/subscriber's premises, e.g., set-top-box (STB). The STB then stores the digital content for subsequent real-time transmission to the user's television set. Such systems permit the user/subscriber to view any one of a number of programs transmitted on a non-real-time basis, and also allows the user to store the transmitted program on the STB for an indefinite period of time for viewing at a later date.

Various methods have been proposed for transmitting the programs on a non-real-time basis. For example, referring to FIG. 1, a typical video server (VS), as disclosed by Verhille et al. in U.S. Pat. No. 5,539,448, is used in a video on demand network wherein video signals are transferred over a communication network (TSY) from the video server to respective terminals connected to the network. The system includes digital storage facilities (DSF), a server control means (SCM), a broadband switch (BS) having first ports (VP1/VPY) to which the storage facilities (DSF) are coupled, second ports (CL) coupled to the communication network (TSY) and a third port (CP) to which the server control means (SCM) is coupled. The server control means (SCM) controls the transfer of digital video content from the storage facilities (DSF) and through the switch (BS) and the communication network (TSY) to the terminals. The broadband switch (BS) also has a set of fourth ports (CP1/CPX) to which system adapters (SYA1/SYAX) are coupled to adapt the video signals to a format which is compatible with the communication network. The server control means (SCM) performs the transfer of video signals firstly from the digital storage facilities (DSF) to the system adapters (SYA1/SYAX) through the switch (BS) and then from the adapter means to the terminals via the communication network (TSY). The system adapters include channel memories and adapters to perform rate and format adaptation of the video signals respectively. The channel memories and the adapters can be directly and separately coupled to the broadband switch.

In operation, video servers like that of Verhille et al. receive user requests transmitted from multiple users' STBs through a distribution network to the server. The requests are routed on to a real time controller, which furthers them to a system controller. If the system controller determines that a given user is permitted access and that the requested video data is in the storage system, the system controller orders the real time controller to permit user access and tells the real time controller where the video data is stored.

The server facility transmits coded digital video data over a broadband PSTN which supplies connectivity to the facility. A user/subscriber may use either a standard telephone instrument over the PSTN or a dedicated control device over an ISDN packet network to order the video programming. Such a device is located at the television set of the user/subscriber and permits a display of the program menu on the television screen.

Connectivity between the server facility and the user/subscriber for transmission of video data is provided by an asymmetrical digital user/subscriber line (ADSL) system. ADSL interface units perform multiplexing of digital video information with voice information to be transmitted to the user/subscriber and support transmission on the ISDN packet data network of a reverse control channel from the user/subscriber to the server facility.

However, conventional video on demand services do not include an integral and comprehensive library of video program material that can be stored directly on the user/subscriber's STB, and hence enable only limited storage capabilities for video and audio data supplied by the server. Enhanced scheduling functionality is required to efficiently support multiple users/subscribers over a temporally diverse programming range. Furthermore, to support network management and enable instantaneous access to multimedia content, a need remains for a system which does not require dynamic interaction with network facilities or to reconfigure network resources in real-time in response to multimedia content requests by plural users/subscribers.

SUMMARY OF THE INVENTION

A general object of the present invention is to provide a system and method for delivering multimedia content, such as video and audio, by means of cable, satellite television or other systems that permit immediate viewing of the content upon user/subscriber request, along with the use of a user/subscriber receptor unit having digital video recording capabilities having at least the memory capacity to store a complete unit of media content, such as full-length feature film.

Another object of the invention is to provide a system and method that does not require the continuous or even periodic interaction between the server facility and the user/subscriber receptor unit, and in particular where the system can function over a one-way network in which all users are being sent the same signal.

A further object of the present invention is to divide the multimedia content into data chunks which are transmitted and recorded on the user/subscriber's STB "just in time" prior to needing to be viewed.

A further object of the invention is to provide a system and method that requires the use of no more than 6 times the bandwidth of the original signal for enabling instantaneous start of video content for an unlimited number of users. In addition, the bandwidth requirement is non-constant, wherein the peak bandwidth is only periodically needed to provide VOD capability.

Another object of the invention is to provide for the enhanced efficient use of available bandwidth by reducing the bandwidth required while still providing immediate viewing, which may be accomplished by pre-storing portions of the multimedia content on the user/subscriber's STB.

Yet another object of the invention is to provide a system and method of dedicating at least one signal from the server facility to common portions of multimedia content, e.g., film starts only, thus avoiding the need for the associated memory space usage on the user/subscriber's STB.

Another object of the invention is to provide for a number of multimedia content starts of up to the maximum number of channels of signal bandwidth.

Another object of the invention is to provide a system and method of allocating one multi-channel signal to an initial user/subscriber followed by adding subsequent users/subscribers to a transmission schedule in such a manner that the subsequent users/subscribers will receive the multimedia data chunks simultaneously with those transmitted to the initial user/subscriber.

A further object of the invention is to prevent any single multimedia content product, e.g., a film, from requiring more than the maximum bandwidth per signal irrespective of how many users/subscribers have requested the content and are having such content transmitted to their STBs.

Another object of the invention is to reduce the cost of adding new users/subscribers to multimedia content already in the progress of being transmitted, as opposed to systems and methods where a separate and unique stream of multimedia content is transmitted to each user/subscriber.

A further object is to allow new users to be added to an existing multimedia stream at a less-than-incremental cost in bandwidth.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

The present invention is a system and method for providing multimedia content, such as video and audio, by means of cable, satellite television or other content providing systems. The invention permits the instantaneous consumption, e.g., viewing, of content, such as movies upon user/subscriber request. The system employs a user/subscriber receptor unit (set-top-box or STB) comprising a programmable video reception and playback device having a digital video recording capability, similar to TIVO™ or other known units having at least the memory (e.g., disk space) to store a complete unit of media content, such as full-length feature film.

The invention does not require intensive interaction with the STB, but simply requires continuous one-way sending and receipt of content signals from the media content server to the receptor unit. The receptor unit can be tuned into the server and enable viewing of the content at anytime. Further, in the worst case, the invention requires the use of no more than 6 times the bandwidth of the original signal.

In the present disclosure, the term "instantaneous" shall be understood to mean substantially instantaneous as in on the order of one minute or so.

The invention can be applied to any form of digital streaming content such as, but not limited to, films, TV programs, motion control data and music. For the purpose of simplifying the description of the invention, examples such as, the streaming films on a pay-per-view TV system will be used. Because of the way pay-per-view systems are currently implemented, use of the invention in such an environment would have considerable benefits.

Figure 1:
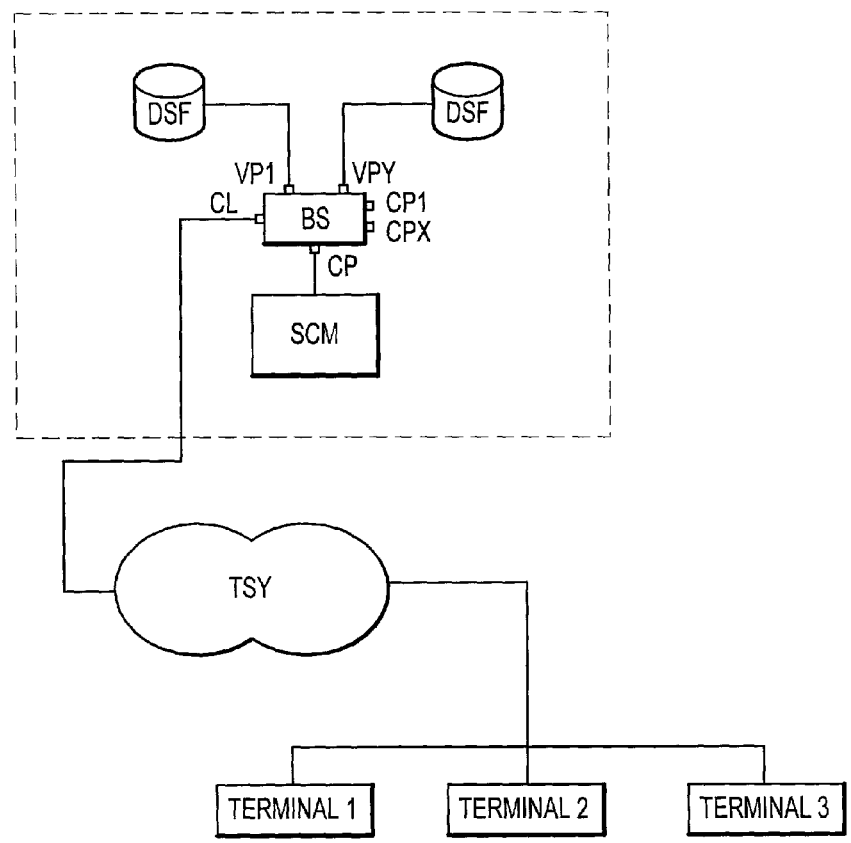
FIG. 1 shows a prior art video on demand (VOD) system.
Figure 2:
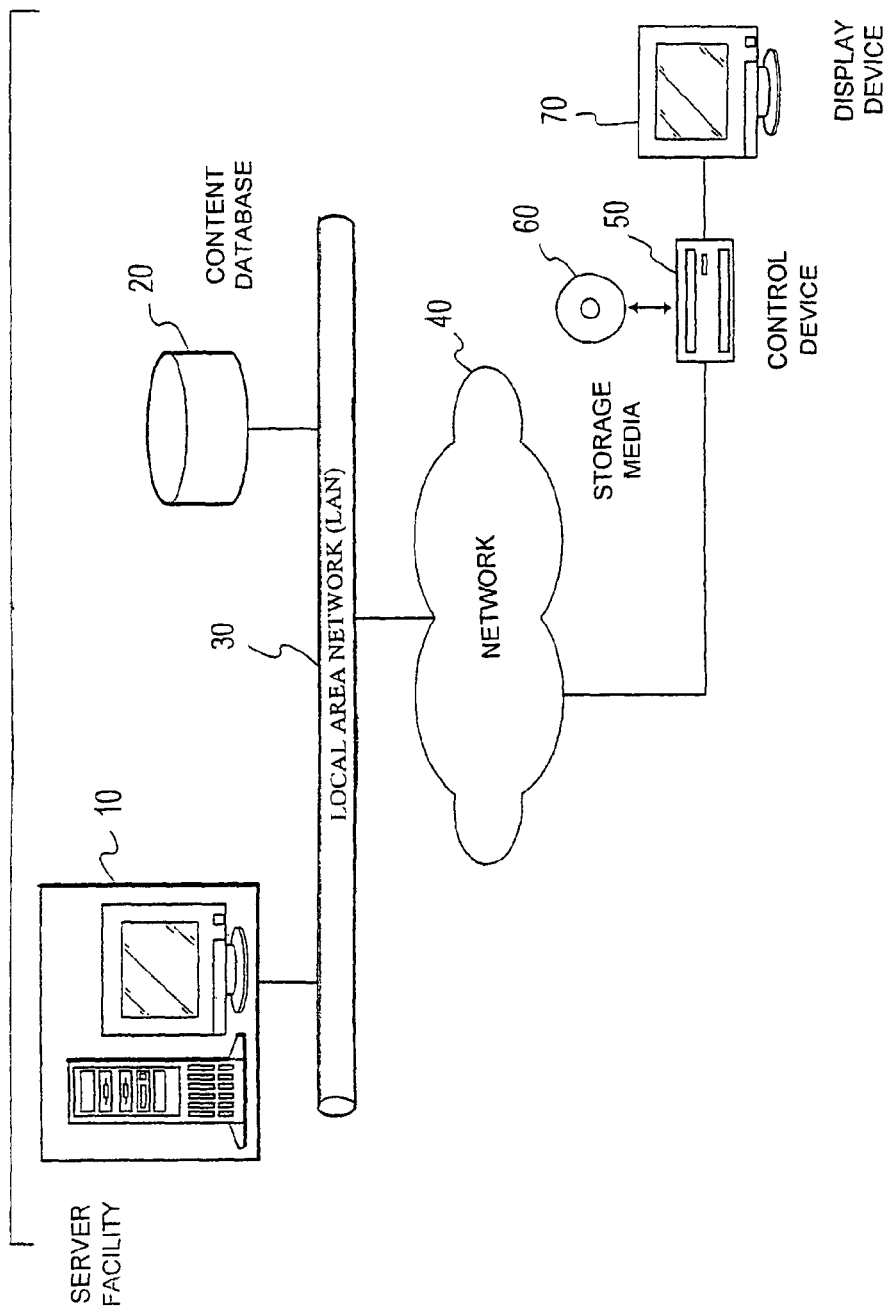
FIG. 2 illustrates an overall system configuration enabling the immediate VOD capability according to an embodiment of the present invention.

FIG. 2 shows the configuration of a system for enabling a video on demand capability according to an embodiment of the present invention. The term "multimedia content" in the context of the specification and claims shall be understood to refer to a collection of downloadable contents which may consist of any one of video linear streaming data, such as motion pictures in the MPEG-2 format, linear audio streaming data such as MP3 data, binary program data, high-resolution graphics data or any combination of such data. The server facility 10 is a server system, which manages user/subscriber requests for multimedia content. Access to the server facility 10, which may comprise one of several servers, is facilitated through a typical device known as a router (not shown) on the Local Area Network (LAN) 30, which directs requests to the multimedia server facility 10. In this embodiment, the multimedia content database 20 is coupled to the server. When the server facility 10 receives requests from a user/subscriber, the server facility 10 executes the transmission of media content from the database 20.

The network 40 is normally a bi-directional digital communications network that connects the users/subscribers' control device 50 with the multimedia server facility 10. With current technologies, a CATV bi-directional network, ISDN or XDSL high speed networks and satellite networks are examples of existing infrastructures enabling the necessary network connections for implementing the present invention.

The user/subscriber's side of the system configuration comprises a control device, e.g., a set-top-box, which may be video game console, for example, including a detachable storage medium 60 therein or external thereto, and a visual monitor or any other suitable display device 70 connected to the control device 50. In a preferred embodiment, the detachable storage media 60 comprises a CD-ROM or DVD disc.

The networked control device 50 is preferably a network connectable player of digital multimedia content having a video recording function, including a hard drive (not shown) therein having sufficient recording capacity for recording at least a full-length motion picture. Such a device 50, according to conventional methods, normally utilizes the detachable storage media 60 as a contents distribution media in a non-networked environment. Stated otherwise, under ordinary use according to conventional known methods, the control device 50 is capable of playing back media contained on the detachable storage media 60, which is commonly an interactive video game, for example, even if the device is not connected to the network. The control device 50 may also be used for viewing of DVD video content provided on the detachable storage media 60, and according to the present invention, also enables recording, on the hard drive, of video content downloaded from the server facility and transmitted through the network 40.

Although FIG. 2 illustrates a video-on-demand system operating over a bi-directional network, it should be understood that the principles of the invention are fully applicable to a one-way network, wherein all users are sent the same signal from the server facility simultaneously, and wherein upstream data transmissions from the user/subscriber's side are not necessary.

Digital cable TV and satellite systems broadcast many signals each containing digital data at 25-30 megabits per second (mbps) of data, wherein 100 signals is common in a typical cable TV system. STBs generally contain one or more tuners for receiving these digital broadcast signals. The digital data on each signal generally contains multimedia content in one of a number of industry standards, such as MPEG-2 compressed video for several channels, typically five or six in number. A user/subscriber STB containing a digital multimedia recording capability, and having a plurality of digital signal tuners, can record one channel while the user/subscriber views another. The standard STB, having two tuners, is presently capable of tuning in up to 60 mbps of digital data at once.

With reference to Table 1, a conventional satellite, cable or other multimedia service provider will typically dedicate six channels, which is one 30 mbps digital signal, and permits transmission of a two and one-half hour movie for example. These six channels allow for the sending of six complete copies of the movie each starting at 30 minute intervals. Table 1 illustrates such a viewing schedule. Each occurrence of the narrative movie title represents one specified showing of the two and one-half hour movie. All six channels are transmitted on a single digital signal and are subsequently received by the user/subscriber's STB.

TABLE 1

(Conventional System)

| Chan | 05:00 | 05:30 | 06:00 | 06:30 | 07:00 | 07:30 | 08:00 | 08:30 | 09:00 | 09:30 | 10:00 | 10:30 | 11 |
|---|---|---|---|---|---|---|---|---|---|---|---|---|---|
| 500 | |--------------- Movie A ---------------| | | |----------------- Movie A -----------------| | | | |
| 501 | | |--------------- Movie A ---------------| | | |----------------- Movie A ----------------| |
| 502 | ----------| | |--------------- Movie A ----------------| | | |------------- Movie A -------------- |
| 503 | -------------------| | |---------------- Movie A ----------------| | | |---------------Movie A --- |
| 504 | Movie A ----------------| | |---------------- Movie A ----------------- | | | |-----------------M |
| 505 | -------Movie A ------------------| | |---------------- Movie A ------------------| | | |----------- |

Accordingly, when the user/subscriber begins viewing the film at 7:00 p.m., for example, as the STB is showing the first half-hour between 7:00 p.m. and 7:30 p.m. on channel 504, the STB simultaneously receives (although the viewer does not ordinary view) the second half-hour on channel 503, the third on 502, the fourth on 501, the fifth on 500 and the sixth on 505. Thus, for a STB having a digital recording capability, the entire movie could, in actuality, be recorded in one half-hour, although in the conventional case the user simply views the entire movie on one channel unaware of what is being simultaneously sent on the other channels.

Hence, in the case of existing conventional pay-per-view TV systems, the same movie is frequently transmitted at staggered start times, such as every half hour as shown in Table 1, over multiple TV channels. This can require people to wait up to as long as one half hour to begin viewing a movie. By contrast, with the present invention, as shall be described below, the waiting time can be reduced to less than one minute, allowing for true "video on demand."

To provide an improvement over the conventional system, the present invention offers a system and method whereby any form of digital streamed content can be converted into a new type of stream of one-way data (hereinafter referred to as an Interleaved Multimedia Stream or IMS) in which a plurality of receivers can begin receiving the IMS at different times during transmission thereof, while still allowing each receiver to present the content in a proper time sequence from beginning to end. To create an IMS, the original signal content stream is broken into smaller "chunks" of data (such as 1 minute in length), wherein each data chunk is repeatedly transmitted on a regular schedule which guarantees that regardless of when a particular receiver begins reception of the stream, each necessary chunk of data will be received "just in time" for playback.

For successful operation, the system requires that the receiver or STB be equipped with a local digital storage means so that the STB can receive the chunks of content in any order and at any time, store them immediately and then present the data chunks for viewing in their proper order, speed and time.

Figure 3:
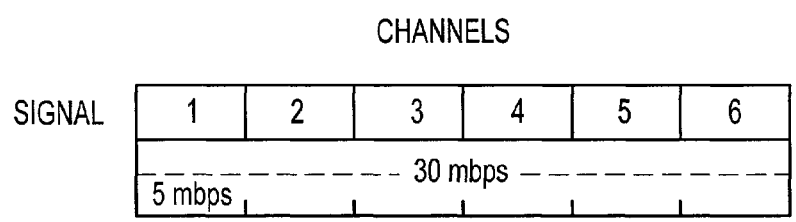
FIG. 3 illustrates packaging of discrete data portions of a digital multimedia content signal according to an embodiment of the present invention.

More specifically, as illustrated in FIG. 3, the present invention divides the digital information into smaller discrete units or "chunks" corresponding to one minute (or any other suitable and convenient unit time) of video content each, and sends them in such a manner that they arrive at the STB just in time to be recorded onto its hard disk drive before they are needed for playback. FIG. 3 shows that when a 30 mbps system having each one minute unit of video being 5 mb long is used, five additional minutes, i.e., bandwidth slots 2-6, of video can be sent to the STB simultaneously for every one minute of video that is being viewed.

Accordingly, the invention provides a system and method for delivering instantaneous multimedia content from a server facility to a user/subscriber. The server facility, as illustrated in FIG. 3, includes a function for dividing formatted content into discrete data chunks prior to their transmission. The communications network facilitates the transmission of the selected content as an interleaved multimedia stream composed of such data chunks. The user/subscriber control device receives and stores the data chunks, and then organizes the chunks and plays the content back in its proper order, speed and time.

To convert a normal digital video stream into the IMS format of the present invention, the original digital video stream is divided into data chunks, such as one minute segments or any other convenient unit of time. Each of these chunks must be transmitted with a frequency equal to its time index in the video. Thus, to permit a movie to begin on one minute's notice, the first minute of video content needs to be transmitted repeatedly once per minute, with the second minute being sent every two minutes, the third every three minutes, the tenth every ten minutes and so forth. That is, in the case of n discrete data chunks, each data chunk occupying a substantially equal unit of time, an nth data chunk is sent once every n units of time. As long as this scheduling rule is followed, regardless of when a subscriber tunes into the data broadcast, every data chunk is guaranteed to arrive at their STB sometime before it would normally be viewed. A chunk may be sent earlier than necessary so long as the rule of sending every nth chunk on or before the nth minute is always obeyed.

As a more specific example, Table 2 illustrates a typical transmission schedule of the present invention for a ten minute video. Each horizontal row represents one minute of time, each column represents one sixth of one minute, which is the time-frame necessary to transmit one minute of video. The numbers in each box depict which precise portion, e.g., minute, of video is being sent in the specified slot.

TABLE 2

| Time | | | | | |
|---|---|---|---|---|---|
| 1 | 1 | | | | |
| 2 | 1 | 2 | | | |
| 3 | 1 | 3 | | | |
| 4 | 1 | 2 | 4 | | |
| 5 | 1 | 5 | | | |
| 6 | 1 | 2 | 3 | 6 | |
| 7 | 1 | 7 | | | |
| 8 | 1 | 2 | 4 | 8 | |
| 9 | 1 | 3 | 9 | | |
| 10 | 1 | 2 | 5 | 10 | |
| 11 | 1 | | | | |
| 12 | 1 | 2 | 3 | 4 | 6 |

TABLE 2-continued

| Time | | | | | |
|------|---|---|---|---|----|
| 13 | 1 | | | | |
| 14 | 1 | 2 | 7 | | |
| 15 | 1 | 3 | 5 | | |
| 16 | 1 | 2 | 4 | 8 | |
| 17 | 1 | | | | |
| 18 | 1 | 2 | 3 | 6 | 9 |
| 19 | 1 | | | | |
| 20 | 1 | 2 | 4 | 5 | 10 |
| 21 | 1 | 3 | 7 | | |
| 22 | 1 | 2 | | | |
| 23 | 1 | | | | |
| 24 | 1 | 2 | 3 | 4 | 6 | 8 |
| 25 | 1 | 4 | 5 | | |
| 26 | 1 | 2 | | | |
| 27 | 1 | 3 | 9 | | |
| 28 | 1 | 2 | 4 | 7 | |
| 29 | 1 | | | | |
| 30 | 1 | 2 | 3 | 5 | 6 | 10 |
| 31 | 1 | | | | |
| 32 | 1 | 2 | 4 | 8 | |

As seen in Table 2, unit 1 is transmitted at minute 1, while in minute 2 unit 1 and unit 2 are transmitted and both can be viewed. After unit 2 is viewed, unit 3 is transmitted and viewed. In minute 4, units 1, 2 are simultaneously transmitted in the two slots preceding the third slot, which itself contains unit 4 for viewing. In minute units 1 and 5 are transmitted. In minute 6, units 1, 2 and 3 are transmitted in the three slots prior to unit 6. Thus, the invention's scheduling permits an interleaving of the transmitted data chunks for storage on the STB which may or may not be needed for immediate viewing by the user/subscriber.

In any event, between the unit being viewed and the units being simultaneously stored on the STB, the user/subscriber is able to view the movie as a seamless multimedia stream, even though the data chunks do not have to be sent serially. For example, if a new user/subscriber begins viewing unit 1 in minute 24, units 2, 3, 4, 6 and 8 are simultaneously stored during this same initial minute. Thus, three additional minutes pass before unit 5 is needed. However, in minute 25, unit 5 is transmitted and recorded on the STB unit, while unit 6 has been previously transmitted and recorded during the previous minute 24 as indicated above. Unit 7 is transmitted in minute 28, which is only 4 minutes after the start of viewing by the user/subscriber at minute 24, so unit 7 has been transmitted prior to its need to be viewed. Unit 8 has also been previously stored in minute 24. Further, unit 9 was transmitted in minute 27, while unit 10 is transmitted in minute 30. Therefore, the entire 10 minute movie has been transmitted within six minutes after the completion of the initial viewing of unit 1 by the user/subscriber at minute 24.

The present invention's system and method permits the required peak bandwidth not to exceed that illustrated in Table 2, so that no more than six times the bandwidth of the original signal is needed. This is a result of the fact that as the movie is progressively viewed later segments of the movie are sent less frequently.

As seen in Table 2, the number of discrete bandwidth units for each specified divisible unit of time, e.g., one minute, is not constant. For example, only one sixth of the available bandwidth is utilized in line 23 (minute 23), while in line 24 all of it is used. Thus, the present invention permits each unit of data to be delivered to the STB just in time, or even earlier than necessary, for viewing as a means of "data averaging" the sent units over time when additional bandwidth is available, such as at line 15 (minute 15).

Table 3 illustrates relative discrete data chunks being presently viewed and corded, along with those previously recorded when the user/subscriber initiates play minute 15 (line 15) based upon the schedule of Table 2.

TABLE 3

| Time Index | Currently Playing | Currently Recording | On Disk |
|------------|-------------------|---------------------|---------|
| 15 | 1 | 1, 3, 5 | |
| 16 | 2 | 2, 4, 8 | 1, 3, 5 |
| 17 | 3 | | 1, 2, 3, 4, 5, 8 |
| 18 | 4 | 6, 9 | 1, 2, 3, 4, 5, 8 |
| 19 | 5 | | 1, 2, 3, 4, 5, 6, 8, 9 |
| 20 | 6 | 10 | 1, 2, 3, 4, 5, 6, 8, 9 |
| 21 | 7 | 7 | 1, 2, 3, 4, 5, 6, 8, 9, 10 |
| 22 | 8 | | 1, 2, 3, 4, 5, 6, 7, 8, 9, 10 |
| 23 | 9 | | |
| 24 | 10 | | |

Similarly, Table 4 illustrates the initiation of play on minute 11 (line 11). It should also be noted that the invention permits the user/subscriber to vary the speed and direction of the presently viewed movie. So long as the recording process continues, the user/subscriber can pause or rewind/review the movie at any time. Assuming the next content portion (data chunk) is already available on the disk, the user/subscriber can also fast forward.

TABLE 4

| Time Index | Currently Playing | Currently Recording | On Disk |
|------------|-------------------|---------------------|---------|
| 11 | 1 | 1 | |
| 12 | 2 | 2, 3, 4, 6 | 1 |
| 13 | 3 | | 1, 2, 3, 4, 6 |
| 14 | 4 | 7 | 1, 2, 3, 4, 6 |
| 15 | 5 | 5 | 1, 2, 3, 4, 6, 7 |
| 16 | 6 | 8 | 1, 2, 3, 4, 5, 6, 7 |
| 17 | 7 | | 1, 2, 3, 4, 5, 6, 7, 8 |
| 18 | 8 | 9 | 1, 2, 3, 4, 5, 6, 7, 8 |
| 19 | 9 | | 1, 2, 3, 4, 5, 6, 7, 8, 9 |
| 20 | 10 | 10 | 1, 2, 3, 4, 5, 6, 7, 8, 9 |

The basic structure and operation of the present invention has been described above. Next, other variants and improvements on the basic system shall be described as additional embodiments of the invention.

In one such embodiment, the present invention permits the pre-storing of data chunks making up the early portions of a movie onto the STB. Moreover, the invention permits the non-sequential transmission and storage of data chunks onto the user/subscriber control device. Accordingly, since the initial portions or minutes of the film are transmitted most often, the invention allows the required bandwidth to be reduced by having those portions pre-stored. The pre-storing of data is performed on a temporally low-priority basis, such as at night time or whenever the user/subscriber regularly is not viewing content. Further, portions such as the first few minutes of films, both presently and in the future by design, often contain common subject matter. These portions presently contain such features as a ratings pages, copyright notices, sound production logos such as Dolby®, as well as studio logos like Sony Pictures®, etc. The invention permits these features to be pre-stored on the hard drive of the STB, thus saving bandwidth. Furthermore, the first portions of a film are commonly at a lower bit rate, as they may be just static images, such as titles, which also reduces bandwidth.

In yet another embodiment, as an alternative to storing film starts on the hard drive of the STB as described in the preceding paragraph, as illustrated in Table 5, at least one signal (composed of six times the bandwidth of the original signal), which is automatically received by the STB whenever a movie is requested, may be dedicated to carrying "film starts" only. This permits more free memory, e.g., disk space, in the STB to be utilized for other non-pre-storing functions. Multimedia content start requests initiated by users/subscribers and generated by plural respective STBs are collected by the server until there is an open slot on the "film start" channel, that is, until the film start for the requested movie comes around again on a given channel within the signal, whereupon the film start is sent to the STB and movie viewing and recording in accordance with the procedures described for Table 1 may begin.

TABLE 5

| | TIME | | | | |
|---|---|---|---|---|---|
| Channel | 05:00 | 05:01 | 05:02 | 05:03 | 05:04 ... |
| 500 | Film 01 (1st min.) | Film 02 | Film 03 | Film 04 | repeats ... |
| 501 | Film 05 (1st min.) | Film 06 | Film 07 | Film 08 | repeats ... |
| 502 | Film 09 (1st min.) | Film 10 | Film 11 | Film 12 | repeats ... |
| 503 | Film 13 (1st min.) | Film 14 | Film 15 | Film 16 | repeats ... |
| 504 | Film 17 (1st min.) | Film 18 | Film 19 | Film 20 | repeats ... |
| 505 | Film 21 (1st min.) | Film 22 | Film 23 | Film 24 | repeats ... |

As will be apparent from Table 5, the invention permits at least six different films per minute to be transmitted for receipt by the STB receiver/recorder, with a one minute or less film start delay. For example, the present invention's system and method permits a 30 mbps signal composed of six times the bandwidth of the original signal to guarantee a start time for each of 24 movies with no more than a four minute delay. Thus, the invention permits "n" number of multimedia content starts, per digital transmission signal, wherein $$1 < n \leq M \quad (1)$$

and further wherein M is the maximum number of channels per signal.

In yet another embodiment, the scheduling of the data chunks can be made dynamic, wherein the server-side computer determines a schedule that best fits the start times of all people on the system currently viewing that movie. In this way, the beginning packets of the movie will only be sent when someone new begins viewing the content, but will quickly "catch up" with the rest of the chunks being transmitted. Thus, bandwidth requirements are further reduced.

Another embodiment of the invention allows the bandwidth requirements and startup times to be adjusted up and down as required for an application. For example, to reduce the average startup time to less than a minute simply requires reducing the size of data chunks while using the same basic scheduling approach already described, and does not significant increase the bandwidth needed to send the IMS. To further reduce load on the server, the smaller data chunk size need only be used for the first few minutes of data, and moreover, the size of the data chunk could be adjusted up or down as needed so long as the transmission schedule is always observed. To decrease bandwidth requirements, a predetermined minimal interval of time may be imposed between transmission of the data chunks, which will reduce bandwidth requirements but increase the average time a receiver must wait before it can start displaying the content. For example, if a minimum of two minutes is imposed, the first chunk of data which would normally be transmitted once per minute would be sent once every two minutes instead, reducing bandwidth but increasing the wait time for starting to two minutes.

In yet another embodiment, a limited two-way connection between the user/subscribers and the server may be provided which facilitates scheduling and transmitting of the interleaved multimedia stream. The user/subscriber's receiver or STB is capable of sending a data signal to the server when the viewing of a particular multimedia stream begins, which the server then uses to dynamically change the transmission schedule, minimizing the bandwidth required even further. According to this embodiment, the server is able to determine when all receivers or STBs are "tuned" into a particular IMS and whether they have received a particular chunk of digital content. If all connected receivers are determined to have received the particular chunk, the server then removes that chunk from the transmission schedule. When a new request for the content was received, the removed chunks are then placed back into the schedule. How much of a bandwidth improvement this technique would provide is difficult to estimate because it depends on how frequently a new user requests a particular piece of content to begin playing. In the case of a new request arriving every one minute, the scheduling would not change from that shown in Table 2, however if the average user requests are spread by as little as two or three minutes the bandwidth requirements will drop noticeably, and for films that are not requested frequently, this technique could reduce bandwidth requirements dramatically.

As has been described herein, the present invention vastly improves the bandwidth efficiency usage for large catalog content VOD systems. The present invention's scheduling system and method permit the allocation of channels which begin sending multimedia content whenever a user/subscriber requests the selected multimedia content. As different users/subscribers request the same movie, the invention permits their addition to the transmission/viewing schedule on a just in time basis. Since data chunks containing the beginning segments are continually are sent along with the content being transmitted and received by the STB of a first user/subscriber, the invention reduces the costs of adding additional users/subscribers to the interleaved multimedia stream already in the process of being transmitted, as opposed to conventional VOD systems where a unique multimedia stream of video data is sent to each user/subscriber's STB. With the present invention, no individual multimedia content product, e.g., a film, consumes more than the maximum bandwidth per signal, e.g., about 30 mb of bandwidth, from the main video server or cable system regardless of how many users/subscribers have requested and are having such content transmitted to their STBs.

According to the present invention, if each short chunk of digital content is transmitted according to the disclosed transmission schedule, anyone may start receiving the interleaved media stream at any time and begin watching the film from the beginning within one minute. Any number of people may be receiving the stream simultaneously and be a different times in the film with no change in the streaming schedule. Because the transmission schedule for each chunk of data can be easily predetermined and never changes, very little computing power is required to schedule the transmission of the data chunks that make up the IMS. This allows a very inexpensive server computer to generate IMSs for many different movies that can be tuned into by an unlimited number of viewers. The hardware requirements for the receiver are similarly undemanding and are easily within the capability of any digital cable or satellite set-top-box equipped with a hard disk or other form of storage device.

Although discussed primarily in terms of delivering video data to users/subscribers, proposed VOD systems will generate data streams which can also include audio, text, graphics and other data types. All references to video data in the specification and claims are intended to include data that comprises either entirely one of these enumerated data types or some mixture of them. Further, nothing herein should be taken to limit the present invention to the storage and transmission of the specifically enumerated data types only.

It shall be understood that various modifications will be apparent and can be readily made by persons skilled in the art without departing from the scope and spirit of the present invention. Accordingly, the following claims shall not be limited by the descriptions or illustrations set forth herein, but shall be construed to cover with reasonable breadth all features which may be envisioned as equivalents by those skilled in the art.

What is claimed is:

1. A method of delivering digital content from a server to a user/subscriber device, comprising:
   providing digital content;
   dividing the digital content into a plurality of data chunks prior to transmission;
   determining a time schedule for the-transmission of the digital content, the time schedule being determined by the server when the user/subscriber device makes a request for the transmission of the digital content, the time schedule optimizing bandwidth consumption;
   pre-storing at least one of the plurality of data chunks on the user/subscriber device independent of the time schedule and prior to the transmission of the digital content;
   transmitting the divided data chunks from the server to the user/subscriber device according to the time schedule, the transmission occurring over a communication network comprising a plurality of channels, wherein each of the plurality of data chunks are transmitted over the plurality of channels at a frequency equal to a time index of the data chunk in the digital content; and
   removing particular divided data chunks from the time schedule upon a determination that all user/subscriber devices receiving the digital content have received the particular divided data chunk to be removed, wherein the server may determine that all the user/subscriber devices have received the particular divided data chunks upon receipt of a data signal sent to the server by all of the user/subscriber devices indicating receipt of the particular divided data chunks.

2. The method according to claim 1, wherein dividing said digital content into said plurality of data chunks occurs at a server facility.

3. The method according to claim 1, wherein the divided digital content comprises p data chunks, each data chunk occupying a substantially equal unit of time, and wherein said transmitting step comprises transmitting an nth data chunk once every n units of time.

4. The method according to claim 1, further comprising selecting digital content provided by a server facility.

5. The method according to claim 1, further comprising scheduling the transmission of at least one of said data chunks for non-sequential transmission.

6. The method according to claim 1, further comprising transmitting at least one data chunk non-sequentially.

7. The method according to claim 1, further comprising storing at least one transmitted data chunk non-sequentially at the user/subscriber device.

8. The method according to claim 1, wherein the transmitted data chunks are made available for immediate consumption by a user/subscriber.

9. The method according to claim 1, wherein at least one transmitted data chunk is stored at the user/subscriber device prior to consumption by a user/subscriber.

10. The method according to claim 1, wherein a first transmitted data chunk is consumed while at least one second transmitted data chunk is simultaneously stored at the user/subscriber device for subsequent consumption.

11. The method according to claim 1, wherein the user/subscriber device comprises data memory for storing at least one complete version of said digital content.

12. The method according to claim 1, wherein said digital content comprises at least one of video, audio, or graphics.

13. The method according to claim 1, further comprising using less than the maximum number of available channels for transmitting the divided data chunks.

14. The method according to claim 1, further comprising dedicating at least one transmission channel to common portions of digital content.

15. The method according to claim 14, wherein said common portions of-digital content include at least one of ratings notices, copyright notices, sound production logos, production trademarks, or service marks.

16. The method according to claim 1, further comprising Providing a number q of digital content starts per digital transmission, wherein $1 < q \leq M$ and M is the maximum number of available channels.

17. The method ac cording to claim 1, further comprising:
   allocating a plurality of channels to a first user/subscriber according to the transmission schedule of divided data chunks;
   adding a second user/subscriber to said transmission schedule for said plurality of channels; and
   receiving said data chunks by said second user/subscriber simultaneously with those data chunks being transmitted to the first user/subscriber following a request for said digital content.

18. The method according to claim 1, further comprising using a same amount of bandwidth for the transmission of digital content irrespective of how many users/subscribers have requested and are receiving such content transmitted to their user/subscriber device.

19. The method according to claim 1, wherein the user/subscriber device includes a digital cable/satellite set-top-box or a video game console unit.

20. The method according to claim 1, wherein the user/subscriber device includes at least one of an external memory storage device, an internal memory storage device, or a detachable storage medium.

21. The method according to claim 1, further comprising modifying digital content consumption variables, wherein said variables include, speed, direction of play, or volume of the digital content.

22. A system for delivering digital content from a server to a user/subscriber device, comprising:
   a digital content database comprising digital content, the digital content having been divided into a plurality of data chunk; prior to transmission;
   a server configured to transmit the digital content at a frequency equal to a time index of the data chunk in the digital content, the server further configured to, pre-store at least one of the data chunks at the user/subscriber device independent of a time schedule and prior to transmission of the divided data chunks according to the time schedule;

a user/subscriber device for receiving at least one of the pre-stored and said transmitted data chunks; and a communications network comprising a plurality of channels for transmitting said divided data chunks from said server according to the time schedule, the time schedule determined by the server when the user/subscriber device makes a request for the transmission of the digital content, the time schedule optimizing bandwidth consumption, and wherein the server removes a particular divided data chunk from the time schedule when it is determined that all user/subscriber devices receiving the digital content have received the particular divided data chunk to be removed from the time schedule upon receipt of a data signal sent to the server by all of the user/subscriber devices indicating receipt of the particular divided data chunk.

23. The system according to claim 22, wherein a server facility comprises means for dividing said digital content into said divided data chunks.

24. The system according to claim 22, wherein a server facility divides said digital content into n discrete data chunks, each data chunk occupying a substantially equal unit of time, and wherein an nth data chunk is transmitted from said server facility once every n units of time.

25. The system according to claim 22, wherein at least some of said data chunks are transmitted to and stored non-sequentially at the user/subscriber device prior to user/subscriber consumption of the digital content.

26. The system according to claim 22, wherein said data chunks are transmitted to and stored at the user/subscriber device prior to user/subscriber consumption of the digital content.

27. The system acceding to claim 22, wherein the user/subscriber device includes a digital cable/satellite set-top-box or a video game console unit.

28. The system according to claim 22, wherein the user/subscriber device includes at least one of an external memory storage device, an internal memory storage device, or a detachable storage medium.

29. The system according to claim 22, wherein said server transmits at least one of said data chunks non-sequentially.

30. The system according to claim 22, wherein said server transmits at least one data chunk non-sequentially according to the time schedule.

31. The system according to claim 22, wherein the user/subscriber device permits the storing of at least one data chunk non-sequentially.

32. The system according to claim 22, wherein the user/subscriber device makes the transmitted data chunks available for immediate consumption by a user/subscriber.

33. The system according to claim 22, wherein the user/subscriber device has a data memory for storing at least one complete version of said digital content.

34. The system according to claim 22, wherein said server uses less than the maximum number of channels for transmission.

35. The system according to claim 22, wherein said server dedicates at least one channel to common portions of digital content.

36. The system according to claim 22, wherein said server provides a number q of digital content star per digital transmission, wherein $1 < q \leqq M$ and M is the maximum number of available channels.

37. The system according to claim 22, wherein said server is further configured to:

allocate a plurality of channels to a first user/subscriber according to the transmission schedule of said divided data chunks;

add a second user/subscriber to said transmission schedule; and permit the receiving of said data chunks by said second user/subscriber simultaneously with those being transmitted to the first user/subscriber following a request for, said digital content.

38. The system according to claim 22, wherein said server uses a same amount of bandwidth for the transmission of digital content irrespective of how many users/subscribers have requested and are receiving such content at their respective user/subscriber device.

39. A server facility for delivering digital content to a user/subscriber device, comprising;

a data processing unit for dividing said digital content into a plurality of data chunks prior to transmission over a plurality of transmission channels; and a communication unit configured to pre-store at least one of the divided data chunks at the user/subscriber device prior lo and independent of the transmission of the remainder of the plurality of divided data chunks, the communication unit further configured to transmit the divided data chunks to the user/subscriber device according to a transmission schedule determined by the server when the user/subscriber device makes a request for the transmission of the digital content, the user/subscriber device comprising a data receiving unit and a data storage unit, said communication unit further configured to transmit the divided data chunks to a first user/subscriber device and a second user/subscriber device simultaneously when the second user/subscriber device is added to said transmission schedule during transmission of the divided data chunks, said transmission occurring at a frequency equal to a time index of the data chunk in the digital content, and wherein the communication unit is further configured to remove a particular divided data chunk from the transmission schedule upon a determination that all user/subscriber devices receiving the digital content have received the divided data chunk to be removed from the transmission schedule, wherein all the user/subscriber devices may be determined to have received the particular divided data chunk upon receipt of a data signal sent by all of the user/subscriber devices indicating receipt of the particular divided data chunk.

40. The server facility according to claim 39, wherein said transmission schedule is further determined such that said data receiving unit of said user/subscriber device receives a first divide data chunk to be reproduced later while said data storage unit of said user/subscriber device simultaneously stores a second divided said data chunk while said user/subscriber device is playing the transmitted digital content.

41. The server facility according to claim 39, wherein said addition of the second user/subscriber device to said transmission schedule is performed by said user/subscriber device without transmission of a request for said digital content from the second user/subscriber device to said server facility.

42. The server facility according to claim 39, further comprising a database for registering a user/subscriber, said addition of a second user/subscriber device to said transmission schedule is performed by registering the second user/subscriber device in said database when said communication unit receives a request for said digital content from said second user/subscriber device.

43. The server facility according to claim 42, wherein said transmission schedule is revised according to the status of current user/subscriber devices when a second user/subscriber device is added to, or an existing user/subscriber device is deleted from, said transmission schedule.

44. The method of claim 1 further comprising receiving the plurality of data chunks at the user/subscriber device in a time period shorter than that of the playing time of the digital content.

45. The method of claim 1, further comprising interleaving the received plurality of data chunks.

* * * * *